W. O. TRAVIS & E. AULT.
J. HUGHES, EXECUTOR OF E. AULT, DEC'D.
APPARATUS FOR PURIFYING SEWAGE OR THE LIKE.
APPLICATION FILED SEPT. 23, 1912.
1,101,106. Patented June 23, 1914.
4 SHEETS—SHEET 1.
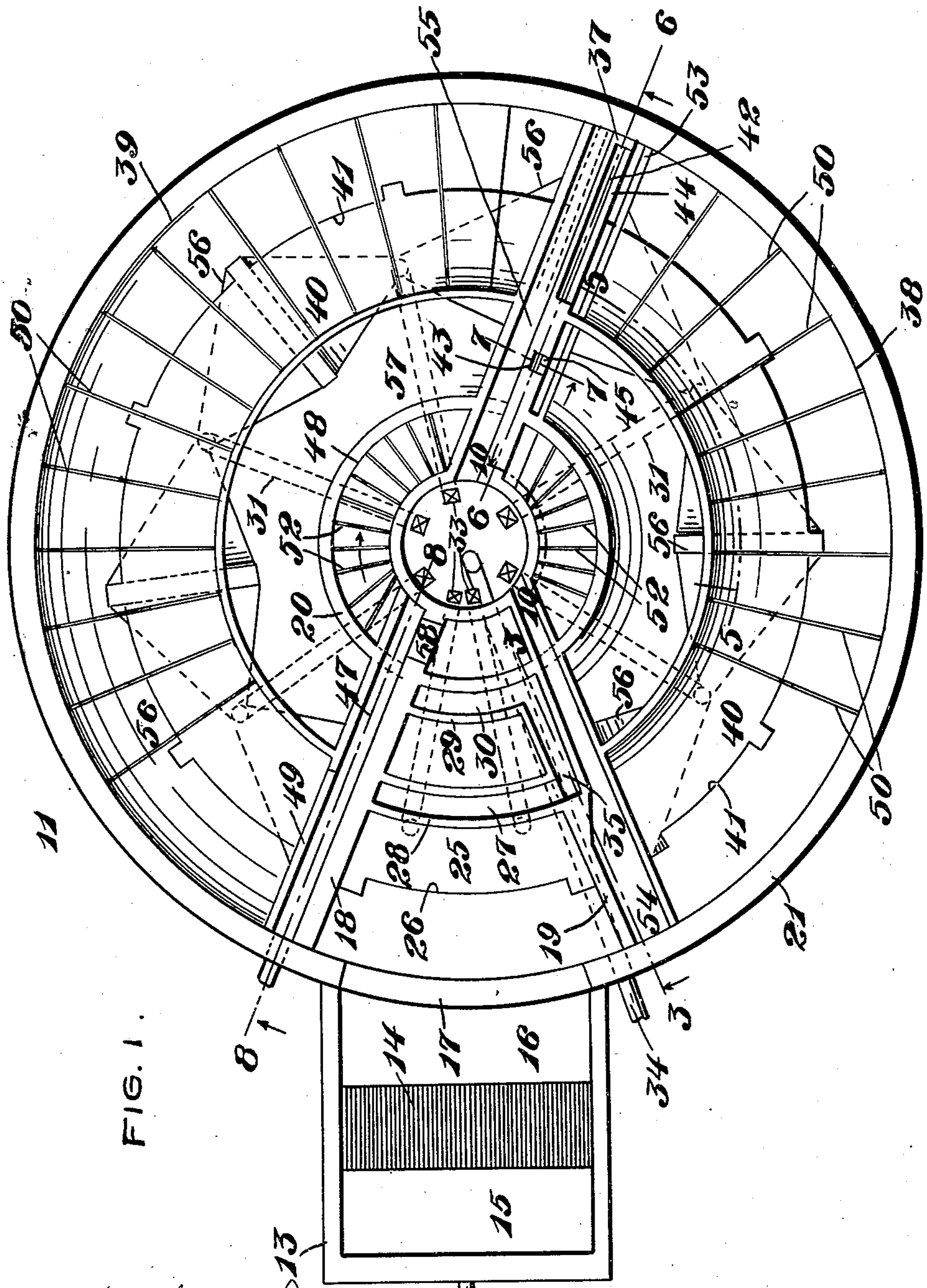
WITNESSES:
Frank Eichhorn.
Thos. J. Gray
INVENTORS:
William Owen Travis,
John Hughes
Executor Edwin Ault deceased,
by Russell M. Everett,
ATTORNEY.
COLUMBIA PLANOGRAPH CO., WASHINGTON, D. C.

W. O. TRAVIS & E. AULT.
J. HUGHES, EXECUTOR OF E. AULT, DEC'D.
APPARATUS FOR PURIFYING SEWAGE OR THE LIKE.
APPLICATION FILED SEPT. 23, 1912.
1,101,106.
Patented June 23, 1914.
4 SHEETS—SHEET 2.
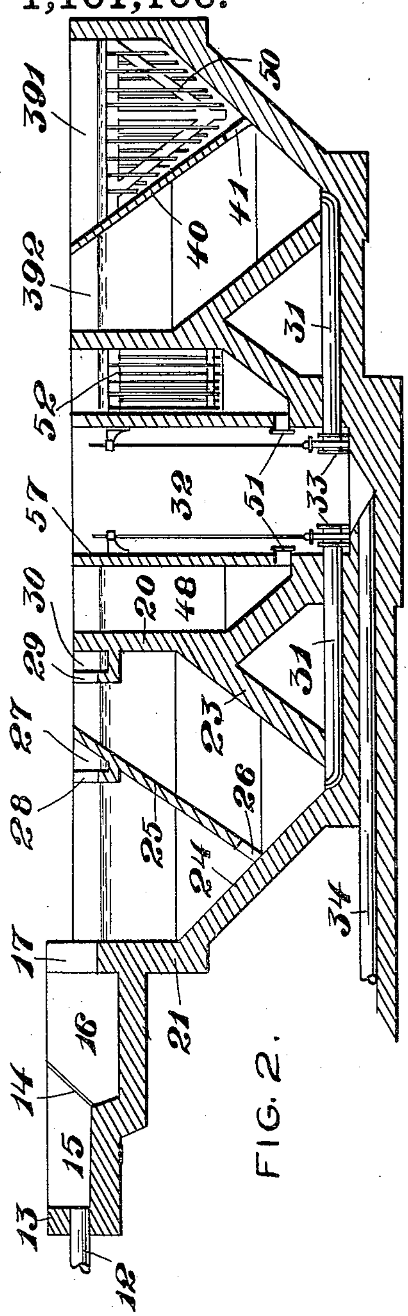
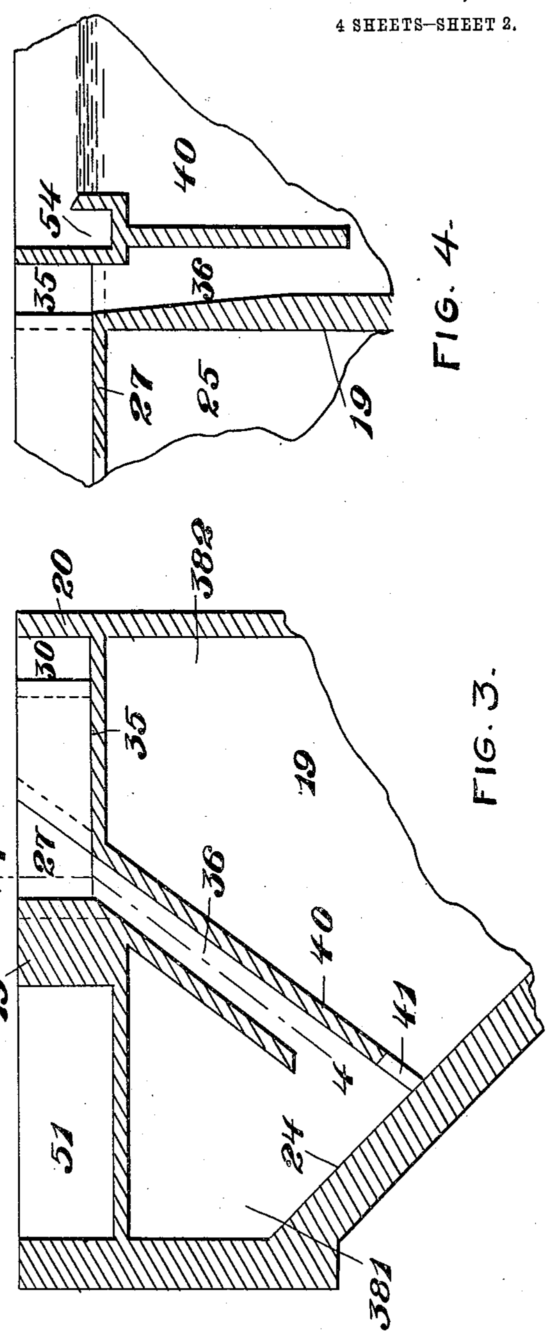
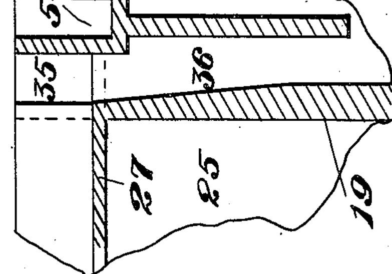
WITNESSES:
Frank Eichhorn
Thos. J. Gray
William Owen Travis, INVENTORS:
John Hughes
Executor Edwin Ault deceased,
Russell M. Everett, ATTORNEY.

W. O. TRAVIS & E. AULT.
J. HUGHES, EXECUTOR OF E. AULT, DEC'D.
APPARATUS FOR PURIFYING SEWAGE OR THE LIKE.
APPLICATION FILED SEPT. 23, 1912.
1,101,106. Patented June 23, 1914.
4 SHEETS—SHEET 3.
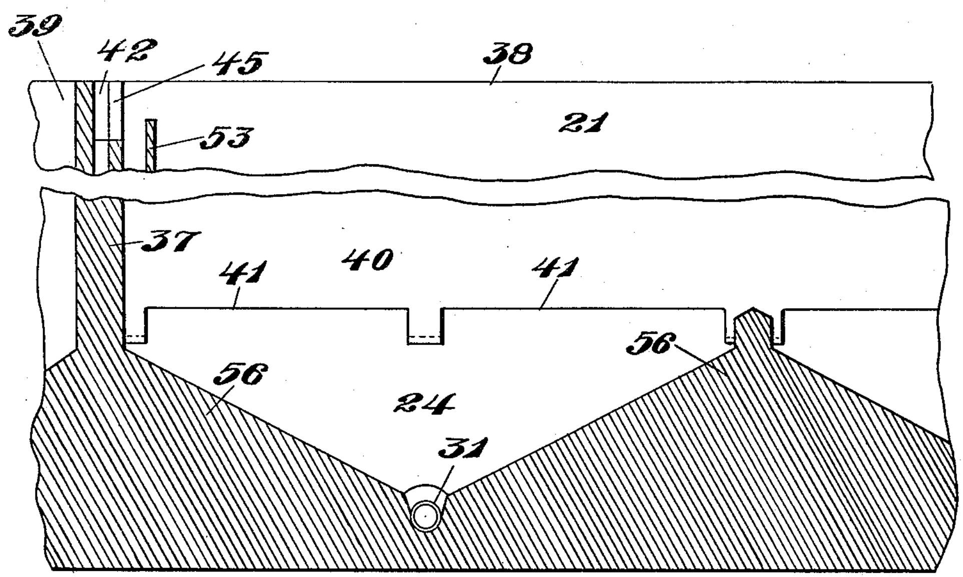
FIG. 5.
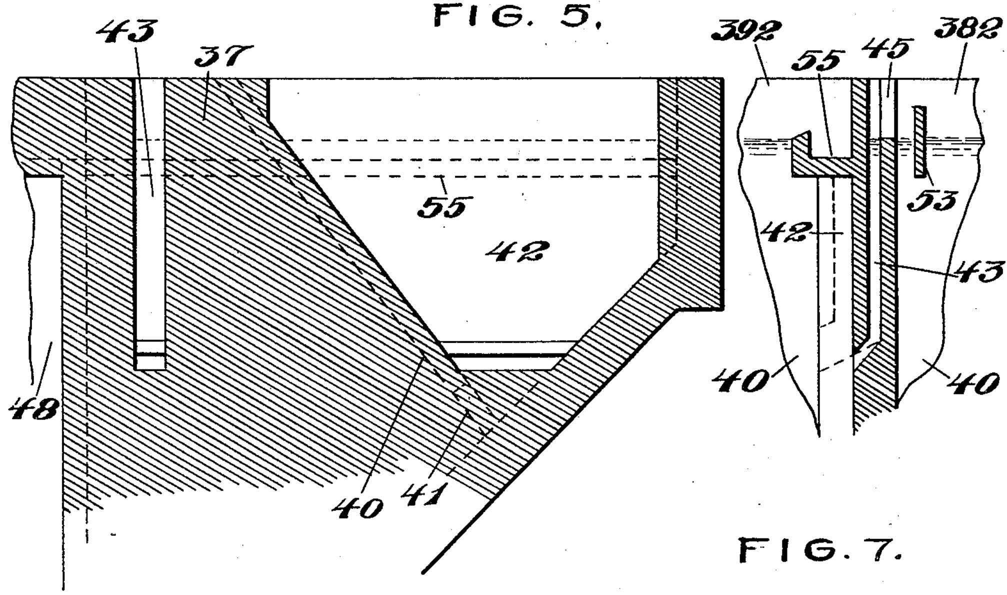
FIG. 6.
FIG. 7.
WITNESSES: Frank Eichhorn
Thos. J. Gray
William Owen Travis, INVENTORS:
John Hughes
Executor Edwin Ault deceased,
Russell M. Everett, ATTORNEY.
COLUMBIA PLANOGRAPH CO., WASHINGTON, D. C.

W. O. TRAVIS & E. AULT.
J. HUGHES, EXECUTOR OF E. AULT, DEC'D.
APPARATUS FOR PURIFYING SEWAGE OR THE LIKE.
APPLICATION FILED SEPT. 23, 1912.
1,101,106. Patented June 23, 1914.
4 SHEETS—SHEET 4.
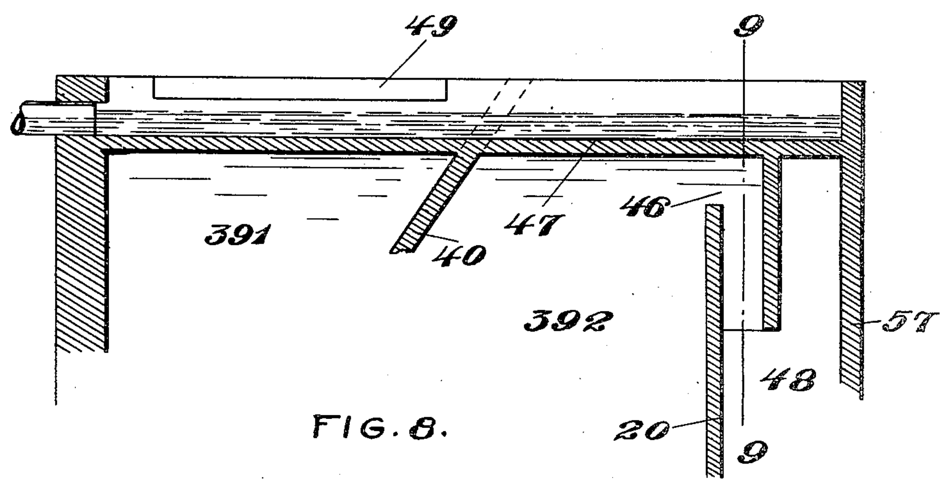
FIG. 8.
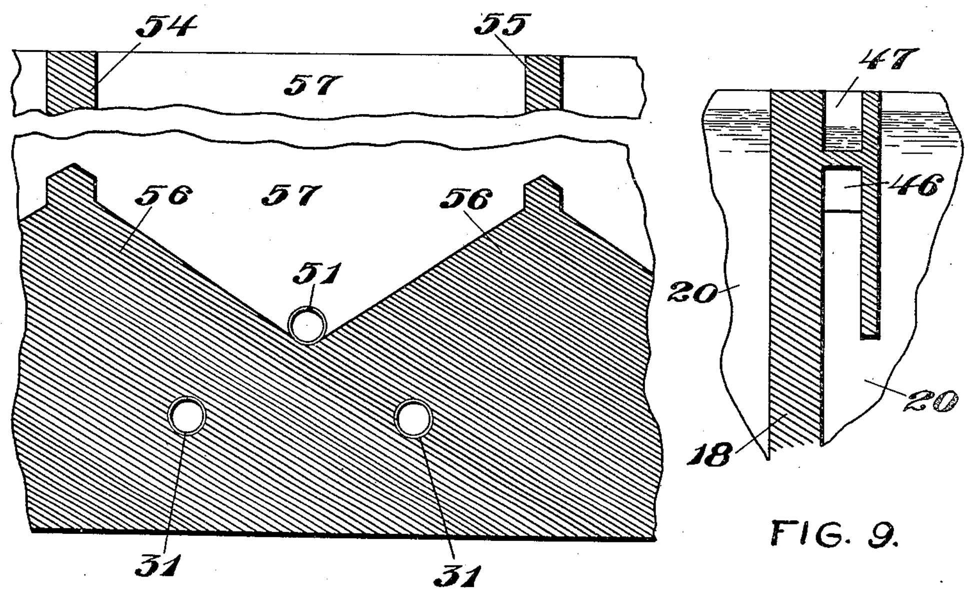
FIG. 9.
FIG. 10.
WITNESSES:
Frank Eichhorn.
Thos. J. Gray
William Owen Travis, INVENTORS:
John Hughes
Executor Edwin Ault deceased,
Russell M. Everett,
ATTORNEY.
COLUMBIA PLANOGRAPH CO., WASHINGTON, D. C.

UNITED STATES PATENT OFFICE.

WILLIAM OWEN TRAVIS, OF HAMPTON, ENGLAND, AND EDWIN AULT, DECEASED, BY JOHN HUGHES, EXECUTOR, OF LONDON, ENGLAND; SAID TRAVIS AND SAID AULT ASSIGNORS TO STERILIZATION COMPANY, A CORPORATION OF NEW JERSEY.

APPARATUS FOR PURIFYING SEWAGE OR THE LIKE.

1,101,106. Specification of Letters Patent. Patented June 23, 1914.

Original application filed Setember 13, 1910, Serial No. 581,805. Divided and this application filed September 23, 1912. Serial No. 721,916.

*To all whom it may concern:*

Be it known that WILLIAM OWEN TRAVIS, a subject of the King of Great Britain, residing at Hampton, Middlesex, England, and EDWIN AULT, late a subject of the King of Great Britain, deceased, did invent certain Improvements in Apparatus for Purifying Sewage or the like, of which the following is a specification.

This application is a division of the prior application Serial No. 581,805 filed Sept. 13, 1910, by said William Owen Travis and Edwin Ault for method and apparatus for purifying sewage or the like.

The objects of this invention are to remove the impurities in suspension in sewage and other impure liquids; to secure the deposit and collection of such impurities rapidly and completely, in the order of their grossness and specific gravity; to provide for such deposit and collection a tank divided into compartments with sloping bottoms, and means for controlling the flow from one compartment to another along said bottoms; to provide means for attracting from the sewage those impurities which exist in the form of colloids or solids in pseudo-solution; to provide means for removing the scum or solid matter which floats on the top of the liquid; to collect all of the solid matter in a common sludge pit from whence it may be led by a single pipe, while the liquid effluent escapes through another channel; to enable the sludge to be drawn off from any compartment at any time without stopping the operation of the tank; to thus keep the tank in constant action in a uniform undisturbed condition; to utilize the pressure of liquid contained in the tank to force out the sludge from the bottom of the compartments, and to obtain other advantages and results as may be brought out in the following description.

Referring to the accompanying drawings, in which like numerals of reference indicate the same parts throughout the several figures, Figure 1 is a plan of a tank which can be employed in carrying out the invention; Fig. 2 is a vertical central section of the same, showing also the way in which certain pipes lead to and from the central pit for the solids; Fig. 3 is a radial vertical section on line 3, 3 of Fig. 1, showing the passage of the liquid from the first section of the tank to the second section; Fig. 4 is a cross section of the same on line 4—4 of Fig. 3; Fig. 5 is a circumferential vertical section taken through the first part of the second section of the tank on line 5—5 of Fig. 1; Fig. 6 is a radial vertical taken through the outlet from the first part of the second section of the tank on line 6—6 of Fig. 1; Fig. 7 is a cross-section of the same on line 7—7 of Fig. 1; Fig. 8 is a radial vertical section on line 8—8 of Fig. 1, through the outlet of the second section of the tank; Fig. 9 is a cross-section of the same on line 9—9 of Fig. 8, and Fig. 10 is a circumferential vertical section taken on line 10—10 of Fig. 1.

In said drawings, 11 indicates a tank by which the improved method of purification can be carried out. This tank is shown in the drawing as circular in form, although it may be of other shapes and nothing herein is intended to limit to any particular form, as that will be greatly varied according to local requirements and other considerations. The tank may be constructed of concrete as shown, and may be reinforced as required according as it is more or less above the ground, or it may be built in any other suitable and well-known manner which will adapt it to the purposes.

The sewage is delivered to the tank through the pipe 12 and first enters a screening chamber 13 across which extends a screen 14 adapted to retain the coarser solid matter, such as rags and vegetable debris. These are held back by the screen 14 in the first compartment 15 of the screening chamber and from time to time removed by hand or mechanically. The liquid sewage passes through the screen 14 into the lower compartment 16 of the screening chamber and from thence flows through the weir 17 into the first section of the tank proper. This first section of the tank comprises that portion of the annular space between the outside wall 21 and intermediate wall 20 which is bounded by the radial partitions 18, 19, said portion constituting about one-eighth of the tank 11 circumferentially. This first section of the tank thus receives the liquid sewage from the screening chamber 13, and commences the separation therefrom of the solids which are carried by said liquid in suspension or pseudo-solution, as will next be described.

The annular portion of the tank between its outer circular wall 21 and similar intermediate wall 20 has its bottom transversely trough-shaped or V-shaped, as shown in Fig. 2, by reason of the outward incline or slope 23 from the intermediate circular wall 20 and an inward slope or incline 24 from the bottom of the wall 21. These sloping bottoms are to facilitate the collection of the sludge or deposited solids as the liquid sewage passes through the tank. The said first section of the tank is divided into outer and inner compartments by a circumferentially extending diaphragm 25, which is inclined downwardly outward at substantially the same angle as the inner slope 23 and engages the outer slope 24 between its upper and lower edges. At the lower edge of this diaphragm 25 is an opening 26 contiguous to the said bottom slope 24. At the upper part of said diaphragm 25, and at the side thereof next the screening chamber 13 is formed a channel 27 which has in its wall next to the outer compartment of the section a weir 28. This weir allows a portion of the sewage to escape from the outer compartment of the first section of the tank and the rest flows through the opening 26. The part which flows through the opening 26 enters the inner compartment of the section at its bottom and escapes over a weir 29 in the outer wall of a channel 30 upon the intermediate wall 20 of the tank. Obviously, the capacities of the weir 29 and the weir 28 govern the proportions of liquid which pass directly through the outer compartment alone on one hand and through both compartments in succession on the other hand. In practice, about two-thirds of the liquid is caused to flow over the said weir 28 and one-third through the opening 26.

By the construction and consequent proportional flow thus described, the solid matter which is deposited from the liquid in the outer compartment onto the sloping side 24 of its bottom is carried by the flow of liquid through the opening 26 to the inner compartment, where it gathers with the solid matter deposited in said compartment in the lower converging portion of said inner compartment. The flow of a portion of the sewage through the opening 26 aids the action of gravity in the deposition and accumulation of the solid matter, and pipes 31 leading from said narrow bottom of the first section of the tank conduct the sludge or solid matter collected into a central pit 32. Valves 33 for each of said pipes enable the collected sludge or solid matter to be periodically drawn off, and from said central pit 32 the sludge or solid matter can escape by a passage 34. While the proportion of sewage flowing through the opening 26 may be varied as desired, it has been found that about one-third gives good results in this first section of the tank. The proportions are preferably varied to suit the character of any particular class of sewage or contaminated liquid by varying the relative lengths of the weirs, the sills of said weirs being on the same level.

The channels 27 and 30 of the first section of the tank open at their ends into a common channel 35 formed in the upper thickened portion of the partition 19, and from which common channel 35 a passage 36 leads downward to conduct the liquid sewage into the second section of the tank. This second section comprises the annular space between the outer and intermediate walls 21, 20 for the remaining seven-eighths of the circumference of the tank and is divided intermediate of its ends by a radial partition 37 into first and second parts 38 and 39. The second section of the tank is also divided circumferentially throughout both said parts into outer and inner compartments, 381, 382 and 391, 392, by a diaphragm 40 which is in substantially the same conical plane with the said diaphragm 25 of the first section. Said diaphragm 40 also provides at its lower edge openings 41 which enables the fluid to pass from the outer to the inner compartment, and the passage 36 by which the liquid comes from the first section enters the outer compartment of the second section.

The partition 37 of the forward end of the first part of the second section of the tank has in itself vertical passages leading downward from its top opposite the outer and inner compartments 381, 382 and marked on the drawings with reference numerals 42 and 43, respectively. In the upper edges of the walls of these passages which are next to said first part of the second section of the tank are formed weirs 44, 45 which control the outlet or escape of liquid from said first part into the second part of the second section of the tank and determine the proportional parts of the liquid which shall pass through the outer and inner compartments of said first part, respectively. For example, eighty-five per cent. of the liquid may flow directly through the outer compartment, and fifteen per cent. through the inner compartment also, to accelerate deposit of the solid matter.

The vertical passages 42 and 43 from the outer and inner compartments, respectively, of the first part of the second section of the tank discharge into the bottoms of the outer and inner chambers of the second part of the second section, respectively, and the flow of sewage continues through said second section until the radial partition 18 is again reached. Here the liquid in the inner compartment 392 of the second part of the second section of the tank passes by a submerged port 46 (see Figs. 8 and 9) in the intermediate annular wall 20, beneath the radial channel 47 formed upon the upper part of the partition 18, into the third section 48 of the tank. Said third section comprises the annular space between the intermediate wall 20 and the inner wall 57, and after passing around this section in the direction indicated by the arrow in Fig. 1, the effluent escapes therefrom over the weir 58 in the partition 18. This weir 58 and the weir 49 in the wall of the channel 47 over which the effluent from the outer compartment escapes thereinto, are of such relative size as to cause a greater proportion of the liquid to flow through the inner compartment of the second part of the second section of the tank than did in the first part of said second section. For example, seventy per cent of the liquid may flow directly through the outer compartment 391 and thirty per cent. through the inner compartment 392 and third section 48 of the tank also, before reaching the channel 47. The effluent when finally received from both of said weirs into the said channel 47 can be led therefrom onto the land or to filters or for any other treatment which may be desired. If desired the effluents from the two weirs 58 and 49 could be kept separate.

While the second section of the tank is shown divided into two parts, it could obviously be divided into any other number of parts in the same way, the purpose of division being to more perfectly fractionate the deposition of the solid matter and prevent any short circuiting of the flow of the liquid. Whatever the number of parts, however, the direct flow through the outer compartments is gradually decreased while the indirect flow through the inner compartments is gradually increased.

It will be noted that after passing over the weirs from one part of the improved tank to another the liquid is conducted downward by a passage to near the bottom of the succeeding part of the tank and the action of gravity in depositing the solids is assisted by the downward flow of that part of the liquid which passes into the inner compartment through the openings in the diaphragm. In this way the solids of higher specific gravity are separated by deposition in the most rapid manner practicable in the earlier period of flow and carried into the lower part of the inner compartment to be removed periodically as required, while the solids of lighter specific gravity are deposited in the later period of flow to be similarly removed.

It has been found that a large though variable quantity of the impurities in the sewage exists in the form of colloids or solids in a pseudo-solution, and that said solids are attracted to all surfaces with which the liquid comes in contact and can be separated from the liquid in that manner. In order to attract these collodial solids and to insure their deposition a large area of surface is provided by means of a number of rods or frames of wood or other solid substance hung vertically or nearly so in the liquid flowing through the outer compartments of the second section and through the final or third section. By these colloiders, which are marked with reference numeral 50 in the drawing, the necessary extensive area of attraction is provided, while owing to the vertical position of the colloiders, the accumulated solids can fall in the most direct manner and be carried into the lower part of the inner compartment. It will be understood that said colloiders can be of any suitable construction desired which presents a proper area of upright surfaces, and the particular construction shown is only for purposes of illustration.

The main object of the inner compartments of the sections of the improved tank is to collect the solids deposited in the outer compartments. The retention of these solids in said inner compartment, even for short periods, is attended by gas formation, the evolution of which is prevented from interfering with the deposition of solids in the outer compartments by the diaphragms 25 and 40, but such gas will constitute a disturbing element in the inner compartments, resulting in the re-conversion into pseudo-solution of some of the solids and to a greater or less extent in the saturation of the liquid with dissolved gases. It is therefore desirable that the final effluent from the inner compartment of the second section of the tank be subjected to a continuation of the process of dissolution in the supplementary or third section before being allowed to go out of the tank. Said third section has its bottom sloped conically toward the central pit 32, and passages 51 are provided for the removal thereinto of the deposited solid matter. Furthermore, said third or final section is provided with a large number of colloiders 52 arranged transversely of itself and the flow of the liquid therethrough, whereby the solids are subjected to further attraction and deposition from the effluent which has become fouled by the disturbance caused by the evolution of gases in the inner compartment of the second section.

In addition to the solids already referred to there are others carried in the sewage which owing to their lighter specific gravity or owing to their having bubbles of gas attached or entangled in their mass, float on the top of the liquid in the tank and several sections thereof in the form of scum. To prevent these solids from being carried forward, a trap or scum-board is arranged edgewise and partly projecting up out of the liquid, in front of the weirs, as shown at 53. Furthermore, at the lower end of each part of the second section of our improved tank is a scum gutter 54 or 55, respectively, into which the scum is periodically swept or removed from the surface of the liquid and conducted to the central sludge pit 32. These scum gutters extend across the tops of the third section of the tank, as shown, to empty into the pit 32.

Preferably, the trough-shaped bottom of the second section of the improved tank has transverse ridges 56, one between each two adjacent outlet pipes 31, the sides of each ridge sloping to the mouth of a pipe. Thus the bottom of the section is composed of inverted pyramidal pockets or funnels, each leading to a pipe 31, which further facilitates removal of the deposited sludge. The bottom of the third section of the tank may be similarly formed, and also the first section, if desired.

Each of the outlet pipes from the chambers of the tank to the central sludge pit 32 is provided with control means, such as the valves 33 shown, and thus any one can be opened at any time. This enables the sludge to be drawn off as necessary, and furthermore without in any way disturbing the operation of the tank when in action.

Briefly, the operation of the improved tank results in: (*a*) The separation of the grosser solid particles in the sewage in the well-known manner by means of a screen or the like, either fixed or movable, which is interposed in the flow of the sewage in such a way that the grosser solid particles are retained on or against the upstream surfaces of the screen whence they are from time to time removed by manual labor or mechanical means. (*b*) The separation of heavy solids chiefly of an inorganic nature, such as road detritus, by passing the sewage through the first section of the tank. (*c*) The separation of the lighter solids of the fine particulate matter and of the solids in the colloid state in a succeeding section or sections of the tank. (*d*) The collection and removal of the several dissociated solids from the various sections or compartments of the tank.

Having thus described the invention, what we claim is—

1. The combination of a reservoir adapted to receive sewage or other liquid, said reservoir having an inclined bottom wall, a diaphragm dividing the reservoir into two compartments and said inclined bottom wall into upper and lower portions, the diaphragm having a part adjacent to the inclined wall, means for supplying liquid to the compartment at the higher part of said inclined bottom wall, outlet channels on the upper parts of side walls of said compartment having weirs in their walls next said compartments, and an outlet at the bottom of the compartment at the lower portion of the inclined bottom wall.

2. The combination of a reservoir adapted to receive sewage or other liquids, said reservoir having opposite converging bottom walls, a diaphragm substantially parallel to one of said bottom walls and meeting the other bottom wall intermediate of its upper and lower edges, said diaphragm having a part adjacent to said last mentioned bottom wall, outlets from the upper part of said reservoir on opposite sides of said diaphragm, an outlet at the bottom of the reservoir, and means for supplying liquid to said reservoir.

3. The combination of a sectional tank adapted to contain sewage or other liquid, means for supplying liquid to one section of said tank, two outlets leading from the upper part of said section into a second section, means for causing part of the liquid in said section to escape directly through one of said outlets and the rest to flow from the upper part of the section downward nearly to its bottom and then upward and out through the other outlet, and a valve controlled outlet at the bottom of said section.

4. The combination of a sectional tank adapted to contain sewage or other liquid, means for supplying liquid to one section of said tank, two outlets leading from the upper part of said section into a second section, means for causing part of the liquid in said section to escape directly through one of said outlets and the rest to flow from the upper part of the section downward nearly to its bottom and then upward and out through the other outlet, two outlets leading from the upper part of the second section of the tank and means in said second section for causing part of the liquid therein to escape directly through one of said outlets and the rest to flow from the upper part of the section downward nearly to its bottom and then upward and out through the other outlet, the ratio of the capacities of the outlets of the second section differing from that of the outlets of the first section.

5. The combination of a sectional tank adapted to contain sewage or other liquid, means for supplying liquid to one section of said tank, two outlets leading from the upper part of said section into a second section, means for causing part of the liquid in said section to escape directly through one of said outlets and the rest to flow from the upper part of the section downward nearly to its bottom and then upward and out through the other outlet, two outlets leading from the upper part of the second section of the tank, means in said second section for causing part of the liquid therein to escape directly through one of said outlets and the rest to flow from the upper part of the section downward nearly to its bottom and then upward and out through the other outlet, the ratio of the capacities of the outlets of the second section differing from that of the outlets of the first section, and valve controlled outlets at the bottoms of said sections.

6. The combination of a tank for sewage or the like, a partition dividing said tank into sections, means for supplying liquid to one section of said tank, outlets leading from the upper part of said section to the lower part of the other along said partition, means for causing the liquid in said first section to escape directly through one of said outlets and the rest to flow downward nearly to the bottom of the section and then upward and out through the other outlet, and means in the said second section for repeating such divisional flow in different proportions from that in the first section.

7. The combination of a reservoir having an inclined bottom wall, an inclined diaphragm in the reservoir dividing the said inclined bottom wall into upper and lower portions, means of communication between the opposite sides of said diaphragm at its junction with the inclined bottom wall, means for supplying liquid to and discharging it from said reservoir, a sludge pit in which liquid may stand at the same level as in the reservoir, and means of communication between said reservoir and sludge pit.

8. The combination of a reservoir adapted to receive sewage or similar liquid, said reservoir having an inclined bottom wall, a diaphragm meeting said bottom wall intermediate of its upper and lower edges and dividing the reservoir into compartments, means of communication between said compartments at the junction of said diaphragm with said inclined bottom wall, colloiders in the compartment at the higher part of said inclined bottom wall, means for supplying liquid to said last mentioned compartment, and outlets for both compartments adapted to cause a divisional flow of the liquid through the reservoir.

9. The combination of a reservoir having a transversely inclined bottom wall, a longitudinal series of colloiders in said reservoir, an inlet for liquid opening into the lower part of the reservoir at one end thereof, an outlet at the upper part of the other end, and valved outlets through the wall of the reservoir at the lower edge of the said inclined bottom wall.

10. The combination of a reservoir having a plurality of successive parts each having an inclined bottom and a diaphragm meeting said inclined bottom intermediate of its top and bottom and dividing the part of the reservoir into compartments, means in each part providing communication between opposite sides of the diaphragm at its junction with the inclined bottom, colloiders in the compartment of each part at the higher side of the diaphragm, means for supplying to the compartment of one part having colloiders, outlets from the compartments of the first part to the compartments of the second part adapted to cause a divisional flow of liquid through said first part, and similar outlets for the compartments of the second part adapted to cause a divisional flow through said second part in different proportions from that in the first part.

11. The combination of a reservoir having a transversely inclined bottom wall, a longitudinal diaphragm meeting said bottom wall intermediate of its upper and lower edges and dividing the reservoir into compartments, means of communication between the opposite sides of said diaphragm at its junction with the inclined bottom wall, a series of colloiders in the compartment at the higher part of said bottom wall, means for supplying liquid to said last-mentioned compartment, a second reservoir, colloiders in said second reservoir, and an outlet leading from the compartment of the first reservoir at the lower part of its said inclined bottom wall into the said second reservoir.

12. The combination of a reservoir having an inclined bottom wall, an inclined diaphragm in the reservoir dividing the said inclined bottom wall into upper and lower portions, means of communication between the opposite sides of said diaphragm at its junction with the inclined bottom wall, means for supplying liquid to and discharging it from said reservoir, a sludge pit in which liquid may stand at the same level as in the reservoir, and valved means of communication with a lower part of said sludge pit.

13. A tank for purifying sewage or other liquid, comprising a middle sludge pit, a series of compartments around said pit, means of communication between successive compartments, means for supplying liquid to and discharging it from said series of compartments, and outlets leading from the bottoms of said compartments to the bottom of said sludge pit.

14. A tank for purifying sewage or other liquid, comprising a middle sludge pit, a series of compartments around said pit, means of communication between successive compartments, means for supplying liquid to and discharging it from said series of compartments, outlets leading from the bottoms of said compartments to said sludge pit, and scum gutters leading from said compartments to said pit.

15. A tank for purifying sewage or other liquid, comprising a central sludge pit, an inner annular compartment around said pit, an outer annular portion around said inner annular compartment divided into compartments, means of communication between successive compartments, means for supplying liquid to and discharging it from said series of compartments, and outlets leading from the bottoms of said compartments to said sludge pit.

16. A tank for purifying sewage or other liquid, comprising a central sludge pit, an inner annular section around said pit, an outer annular portion around said inner annular section, substantially radial partitions dividing said outer annular portion into sections, means of communication between successive sections, means for supplying liquid to and discharging it from said sections, and outlets leading from the bottoms of said sections to said sludge pit.

17. A tank for purifying sewage or other liquid, comprising a central sludge pit, an inner annular section around said pit, an outer annular portion around said inner annular section, substantially radial partitions dividing said outer annular portion into sections, means of communication between successive sections, means for supplying liquid to and discharging it from said sections, outlets leading from the bottoms of said sections to said sludge pit, and substantially radial scum gutters leading across said sections to the said sludge pit.

WILLIAM OWEN TRAVIS.
JOHN HUGHES,
*Executor of Edwin Ault, deceased.*

Witnesses:
BERTRAM H. MATTHEWS,
TRAVIS J. BIGNELL.

Copies of this patent may be obtained for five cents each, by addressing the "Commissioner of Patents, Washington, D. C."